United States Patent [19]

Althof et al.

[11] Patent Number: 5,398,780
[45] Date of Patent: Mar. 21, 1995

[54] LINEAR ACTUATOR WITH SPEED CONTROLLING BRAKE

[75] Inventors: Jon B. Althof; Steven C. Paul, both of Rockford, Ill.

[73] Assignee: Sundstrand Corporation, Rockford, Ill.

[21] Appl. No.: 19,975

[22] Filed: Feb. 19, 1993

[51] Int. Cl.6 .................. F03G 1/10; F16H 25/22; G05G 17/00
[52] U.S. Cl. .............................. 185/39; 74/2; 74/89.15; 188/185; 244/58; 254/103
[58] Field of Search .............. 74/89.15, 2; 185/39, 185/40 R; 188/185; 482/119; 244/58; 254/103; 16/64

[56] References Cited

U.S. PATENT DOCUMENTS

| | | | |
|---|---|---|---|
| 1,579,788 | 4/1926 | Schwerin | 254/103 |
| 2,587,652 | 3/1952 | Rostine | 188/185 X |
| 2,946,235 | 7/1960 | Musser | 188/185 X |
| 3,127,788 | 4/1964 | Martens | 74/586 |
| 3,730,015 | 5/1973 | Cornell | 74/424.8 R |
| 3,766,698 | 10/1973 | Kusiak | 74/424.8 R |
| 4,411,596 | 10/1983 | Chilman | 416/51 |
| 4,479,397 | 10/1984 | Jelinek et al. | 74/89.15 |
| 4,630,866 | 12/1986 | McFarlane | 74/89.15 X |
| 4,675,938 | 6/1987 | Bundschuh | 16/64 X |
| 4,676,458 | 6/1987 | Cohen | 244/58 |
| 4,717,095 | 1/1988 | Cohen | 244/58 |
| 4,742,976 | 5/1988 | Cohen | 244/58 |
| 5,048,151 | 9/1991 | Orii et al. | 16/64 |
| 5,195,937 | 3/1993 | Engel et al. | 482/116 X |

Primary Examiner—Allan D. Herrmann
Attorney, Agent, or Firm—Lawrence E. Crowe

[57] ABSTRACT

An actuator suitable for use as an ejection jack for deploying an aircraft mounted ram air turbine is provided. The actuator utilizes a spring powered ballscrew operatively coupled to a centrifugally actuated brake in such a manner that the brake limits the speed of reciprocating movement of the ballscrew. The problems of fluid leakage and slow deployment at cold temperatures, often encountered in prior ejection jacks utilizing hydraulic dashpots for speed control, are thus eliminated. The actuator also includes a locking device for locking the actuator in either an extended or a retracted position. Features are also provided for attaching an external drive mechanism in a manner allowing the ballscrew to be utilized for resetting the actuator to an initial non-extended position.

52 Claims, 5 Drawing Sheets

FIG. 1

FIG. 3
LOCKED AGAINST RETRACTION

FIG. 4
EXTENDING

FIG. 5
IN TRANSITION

FIG. 6
LOCKED AGAINST EXTENSION

FIG. 7
RETRACTING

FIG. 9

LINEAR ACTUATOR WITH SPEED CONTROLLING BRAKE

FIELD OF INVENTION

This invention relates to a ram air turbine, and more particularly to an actuator suitable for deploying and retracting the ram air turbine.

BACKGROUND OF INVENTION

For many years, aircraft have included a backup power source which provides power for certain critical flight control or avionics systems, in the event of a failure of primary or secondary power sources, in the form of a ram air turbine driven electrical generator or pump which may be lowered from a normal stowed position within the aircraft fuselage to a deployed position in the air stream whereat the relative speed of the aircraft through the ambient air causes the ram air turbine to rotate and drive the generator or pump.

Typically, the generator or pump and ram air turbine are attached to the distal end of a strut which is typically mounted within the storage bay in the aircraft fuselage in a manner allowing the ram air turbine to be deployed by causing the strut to rotate outward into the air stream. An ejection jack or other actuation means is typically utilized to cause the outward rotation of the strut into the air stream. Locking devices are also generally provided for securing the strut in both the stowed and deployed positions. Examples of such ram air turbines and their associated deployment mechanisms are provided by U.S. Pat. Nos. 4,411,596, 4,717,095, 4,742,976, and 4,676,458, assigned to the assignee of the instant invention.

Since it is highly desirable to deploy the ram air turbine as quickly as possible when backup power is required, and also to minimize the size and weight of the ejection jack, it is common practice to mount the strut in a manner which provides rotation during deployment in a direction such that the forces generated by aerodynamic drag on the ram air turbine will aid the ejection jack in rotating the strut from the stowed to the deployed positions. Since the aerodynamic drag on the ram air turbine during deployment may be considerable for an aircraft traveling at high speed, it is often necessary when such a mounting arrangement is used to provide means for controlling the speed of deployment as well as means for absorbing energy as the strut approaches the deployed position in order to prevent damage to either the aircraft structure or the ram air turbine due to mechanical shock.

Prior ejection jacks have typically utilized a recirculating ballscrew or acme screw type actuator, driven either electromechanically or by a stored energy device such as a spring, in conjunction with a hydraulic dashpot which provides control of deployment speed and end of stroke damping to prevent mechanical shock to the ram air turbine or aircraft structure. An example of a stored energy actuator utilizing a spring and hydraulic dashpot is provided by U.S. Pat. No. 4,717,095.

While actuators of the type described above have been successfully used in the past, further improvement is required. Specifically, electromechanically driven actuators must be supplied with a source of electrical power which requires that the aircraft carry what is in essence an additional failsafe backup power supply for use in deploying another backup power supply in the form of the ram air turbine. Inclusion of this additional power supply obviously adds undesirable weight, cost, and complexity and significantly reduces the reliability of electromechanically driven actuators. Aside from the obvious problem of leakage potential created by hydraulic dashpots, an additional problem is encountered when actuators including hydraulic dashpots are utilized in the cold ambient temperatures incident with aircraft operation at high altitudes. Modern aircraft routinely operate at altitudes where ambient temperatures are −65° F. to −80° F. At these extreme temperatures, hydraulic damping fluids used in connection with hydraulic dashpots become so viscous that achievement of deployment within a reasonably short time becomes difficult.

An additional shortcoming of prior actuators used as ejection jacks is that they typically do not include any means for locking the strut in the stowed or deployed positions, thereby requiring the addition of separate uplock and downlock devices to be used in association with the ram air turbine.

An additional problem which must be addressed in the design of an ejection system for a ram air turbine is the provision of means for restowing the ram air turbine after the aircraft is on the ground. In this respect, the electromechanically powered actuators may have an advantage in that the motor can simply be run in the opposite direction to drive the strut back into a stowed position. For stored energy type actuators, the spring force utilized during deployment is often on the order of 2,000 pounds such that even with mechanical advantage provided by the strut, it becomes very difficult for a flightline mechanic to restow the ram air turbine manually. As a result, actuators of this type typically must incorporate means for attaching some sort of a lever or other prime mover to achieve the mechanical advantage necessary to overcome the large spring force.

The instant invention is directed to overcoming one or more of the aforementioned problems.

SUMMARY OF THE INVENTION

It is the principal objective of the instant invention to provide a new and improved actuator for use as an ejection jack for a ram air turbine. More specifically, it is an object of the instant invention to provide a simple, cost effective, reliable, and maintenance free dry actuator of the stored energy ballscrew type for use as an ejection jack for a ram air turbine. The instant invention achieves the foregoing objects in an actuator comprising a force transmitting, reciprocating member mounted for reciprocating movement along a path, and a centrifugally actuated brake operatively connected to the reciprocating member in a manner to be driven by and limit the speed of the reciprocating movement of the reciprocating member along the path.

An exemplary embodiment of the instant invention achieves the foregoing objects in an actuator having a portion of the force transmitting, reciprocating member provided in the form of a lead screw of a recirculating ballscrew device, with the reciprocating member being mounted for reciprocating movement between a retracted position and an extended position along the path. The lead screw portion of the reciprocating member is drivingly connected to and carried by a ballnut journaled for rotation about a first axis coincident with the path. Motive force is provided by a spring operatively connected to store energy through compression when the reciprocating member is disposed in non-extended positions between the retracted and extended positions and to apply force for urging the reciprocating member toward the extended position along the path. The exemplary embodiment of the instant invention also includes a centrifugally actuated brake operatively connected to the reciprocating member in a manner to be driven by and to limit the speed of reciprocating movement of the reciprocating member along the path.

In a preferred embodiment of the actuator, a locking device is also included for locking the reciprocating member in either the retracted or extended position. The preferred embodiment of the instant invention also includes an end of travel snubber operatively connected to the reciprocating member in a manner to absorb energy and lessen mechanical shock when the reciprocating member reaches the extended and retracted positions. The preferred embodiment further includes reset means for returning the reciprocating member to the retracted position and compressing the spring.

Other objects and advantages will become apparent from the following specification, taken in conjunction with the accompanying drawings.

DESCRIPTION OF THE PREFERRED EMBODIMENT

Figure 1:
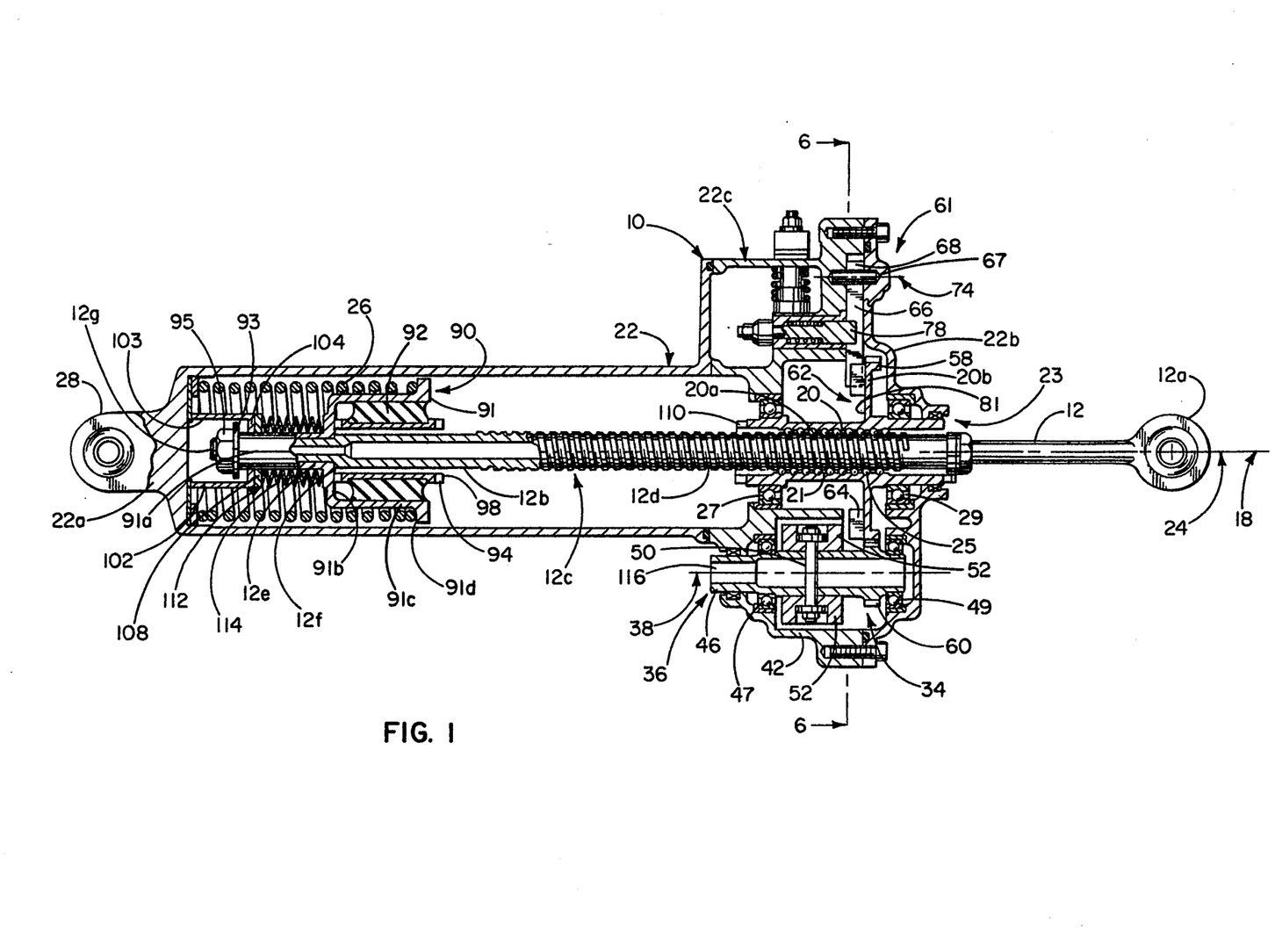
FIG. 1 is a cross-sectional view of an exemplary embodiment of an actuator according to the instant invention in a fully retracted position.

Referring to FIG. 1, an exemplary embodiment of an actuator, generally designated 10, according to the instant invention, includes a generally cylindrical housing 22 having at one end thereof an apertured ear 28 affixed to an integral radially extending end wall 22a by which the housing 22 may be pivotably attached to a mounting structure (not shown). The end of the housing 22 opposite the end wall 22a is defined by an end cap 22b having a central opening 23 through which an elongated, force transmitting, reciprocating member 12 slidingly extends. The reciprocating member 12 terminates external to the housing 22 in an apertured swivel end 12a for pivotable attachment to a device, (not shown), which is to be moved by the actuator as a result of reciprocating movement of the reciprocating member 12 along a path 18 between a fully retracted position, as shown in FIG. 1, and a fully extended position, as shown in FIG. 1a.

Figures 1A, 2, 8:
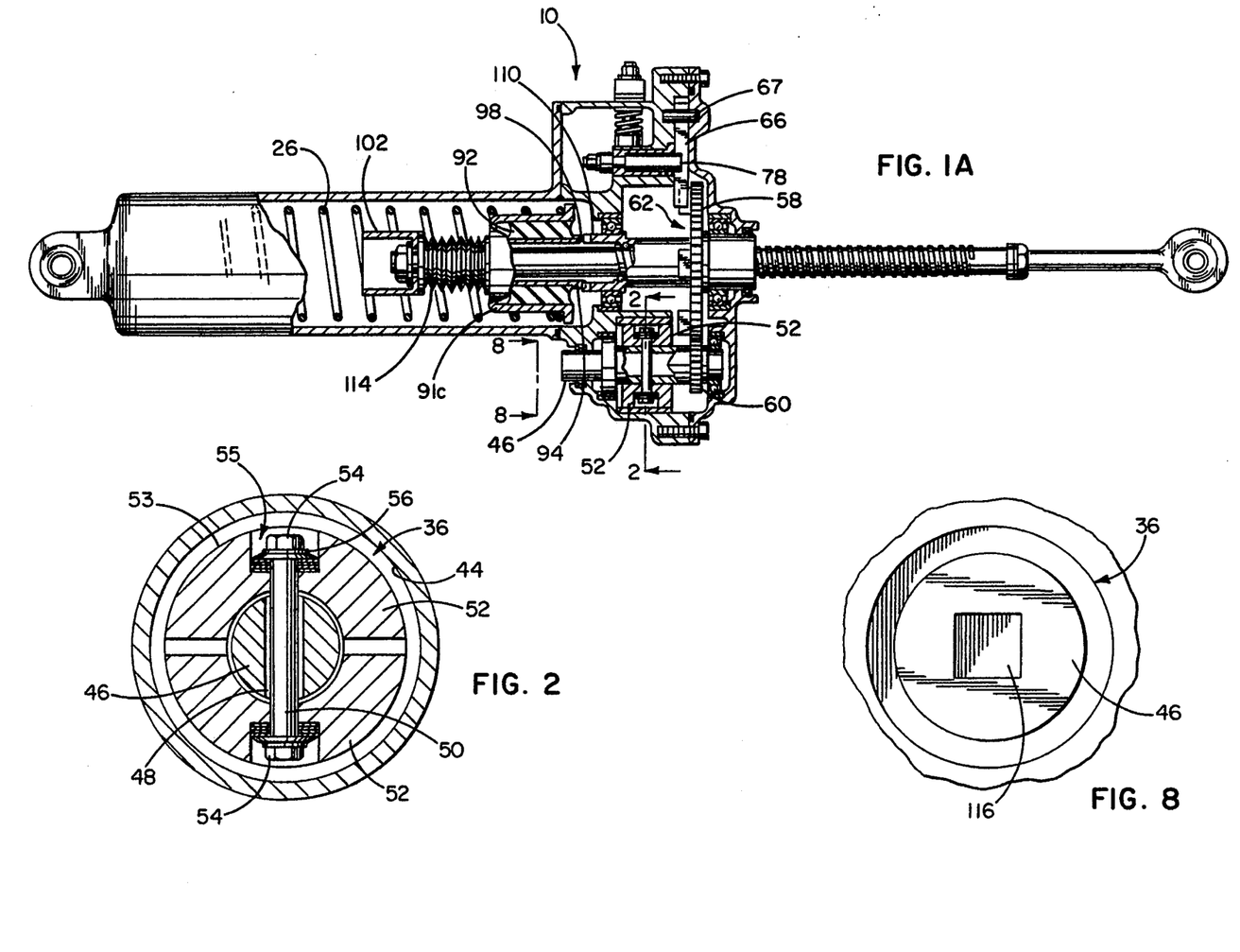
FIG. 1a is a cross-sectional view of the actuator of FIG. 1 in a fully extended position.
FIG. 2 is an enlarged cross-sectional view of a centrifugal brake of the actuator of FIG. 1.
FIG. 8 is an enlarged view of a square drive socket of reset drive means for returning the actuator of FIG. 1 to the fully retracted position.

Within the housing 22, the actuator 10 includes a primary source of motive force in the form of a helical compression spring 26, hereinafter referred to as the primary spring 26, which is disposed in an operative manner between an end of travel snubber mechanism, generally designated 90, fixedly attached to an inner end, generally designated 12b, of the reciprocating member 12 and the end wall 22a of the housing 22 to apply force created by energy stored through compression of the spring 26 for urging the reciprocating member 12 to move toward the fully extended position, as shown in FIG. 1a.

A centrifugally actuated brake, generally indicated as 34, is operatively connected to the reciprocating member 12 in a manner to be driven by and to limit the speed of the reciprocating movement of the reciprocating member 12 along the path 18. Operative connection between the reciprocating member 12 and the centrifugal brake 34, and conversion of the reciprocating movement of the reciprocating member 12 into rotary motion suitable for driving the brake, are accomplished by configuring a portion of the reciprocating member as a lead screw 12c of a recirculating ballscrew device, generally designated 13, wherein the lead screw 12c is connected to and carried by a ballnut 20 of conventional configuration journaled for rotation within the housing 22 about a first axis 24 coincident with the path 18. Specifically, the reciprocating member 12 and ballnut 20, respectively, include complimentary helical grooves 12d, 20a, forming a helical channel 21, having a spherical cross-section for receipt of a series of balls 25, disposed within the channel 21, to connect the reciprocating member to the ballnut 20. The ballnut 20 includes a tubular raceway (not shown) which provides a passage for the balls to recirculate between opposite ends of the channel 21 in a conventional fashion. As a result of this construction, it will be appreciated that, when the reciprocating member 12 extends from or retracts into the housing 22, the balls 25 will move along the channel 21, causing the ballnut 20 to rotate within bearings 27, 29 about the first axis 24. Thus, the ballnut 20 serves to convert reciprocating motion to rotary motion and the reverse.

The centrifugally actuated brake 34 includes a rotatable, driven member, generally designated 36, mounted for rotation about a second axis 38 within a stationary outer member 42 which is provided by a cylindrical bore within the housing 22. The ballnut 20 includes a radially extending annular flange 20b having gear teeth attached to the radially outer periphery thereof to form a first gear 58 rotatable about the first axis 24. The driven member 36 of the brake 34 includes gear teeth attached thereto to form a second gear 60 rotatable about the second axis 38, with the second gear 60 being associated in gear mesh relation with the first gear 58 and thereby providing operative connection between the reciprocating member 12 and the centrifugally actuated brake 34.

Referring now to FIGS. 1 and 2, it will be seen that the driven member 36 of the brake 34 includes a shaft 46 rotatable within bearings 47, 49 about the second axis 38 and having a radially directed hole 48 passing perpendicularly through the shaft 46. A guide pin 50 extends through the hole 48 and from alternate sides of the shaft 46. Circular arch-shaped brake shoes 52 are slideably mounted on the guide pin 50 on alternate sides of the shaft 46, with a radially outer surface of the brake shoes 52 defining a first frictional surface 53 of the brake 34. A retainer 54, in the form of a nut, is attached at each end of the guide pin 50 within a recess 55 of the brake shoes 52 for retaining the brake shoes 52 on the guide pin 50. A spring 56, in the form of a Belleville washer, is disposed between the retainer 54 and the brake shoes 52 at each end of the guide pin 50 for urging the brake shoes 52 toward the retracted position as best seen in FIG. 2, wherein the first frictional surfaces 53 of the brake shoes 52 are spaced radially inward from the radially inner surface of the stationary member 42.

As a consequence of this construction, it will be appreciated that, when the driven member 36 is rotated about the second axis 38, the brake shoes 52 will tend to move radially outward from the retracted position toward a maximum extended position (not shown) in response to centrifugal forces generated on the brake shoes 52, with the speed and rate at which such radial movement occurs being predetermined by the design of the Belleville springs 56 and brake shoes 52.

At a predetermined speed, the brake shoes 52 will have extended far enough radially for the first frictional surfaces 53 of the brake shoes 52 to contact a second frictional surface 44 defined by the radially inner surface of the stationary outer member 42 of the brake 34, thereby providing resistance to further increase in the rotational speed of the driven member 36, and by virtue of the operative connection between the brake 34 and the reciprocating member 12, thereby also limiting the speed of reciprocating movement of the reciprocating member 12.

As previously stated, and as seen in FIG. 1, in which the actuator 10 is depicted with the end wall 22a of the housing to the left and the apertured swivel end 12a of the reciprocating member 12 extending outward of the housing 22 toward the right, the actuator 10 of the exemplary embodiment includes an end of travel snubber mechanism, generally designated 90, fixedly attached to an inner or left end 12b, as viewed in FIG. 1, of the reciprocating member 12. In addition to providing end of stroke snubbing at both the fully extended and retracted positions, the end of travel snubber also operatively connects the primary spring 26 to the inner end 12b of the reciprocating member 12.

Specifically, the inner or left end 12b of the reciprocating member includes a reduced diameter portion 12e extending from a shoulder 12f to a distal threaded end 12g of the reduced diameter portion 12e. A load cap 91 having a first cylindrical portion 91a extending to the left of an annular radially extending wall 91b, and a second cylindrical portion extending to the right of the radially extending wall 91c, is fixedly attached upon the reduced diameter portion 12e of the reciprocating member 12 between the shoulder 12f and a washer 93 by a nut 95. The second cylindrical portion 91c of the load cap 91 includes at the distal end thereof an annular radially extending flange having a left side thereof configured to provide a bearing surface 91d for the primary spring 26, thereby operatively coupling the primary spring to the reciprocating member 12.

End of travel snubbing for the retracted position is provided by a boost spring, generally designated 112, in the form of a plurality of Belleville washers 114 arranged in a series relationship, a load washer 108, and a load cup, generally designated 102, arranged from right to left in the order recited and slideably mounted upon the first cylindrical portion 91a of the load cap 91. The load cup 102 includes an axially extending annular outer wall 103 extending toward the end wall 22a of the housing 22 from an annular radially extending wall 104 having an inner diameter smaller than the washer 93 such that the load cup 102 is slideably retained upon the first cylindrical portion 91a of the load cap 91 by the nut 95 and washer 93.

As seen in FIG. 1, the distal end of the outer wall 103 of the load cup 102 extends axially beyond the inner end 12b of the reciprocating member 12 such that, as the reciprocating member 12 approaches the fully retracted position, the distal end of the load cup contacts the end wall 22a of the housing 22 and compresses the boost spring 112, thereby providing a cushioning or snubbing action as the reciprocating member 12 nears the fully retracted position.

As a consequence of this construction, it will be appreciated by those skilled in the art that the boost spring 112 actually serves a dual function by providing end of stroke snubbing at the retracted position as just described and by providing an additional spring force in parallel to the primary spring 26 over a short distance of the reciprocating movement approximate the fully retracted position. Due to the unique force vs. displacement characteristics of the Belleville springs 114, the boost spring 112 provides significant additional force to the reciprocating member 12 during an initial portion of the reciprocating movement when the reciprocating member 12 is nearly fully retracted.

As seen in FIG. 1a, the end of travel snubber 90 also includes elements to provide end of travel snubbing approximate the fully extended position in the form of an annular-shaped, elastomeric element 92 disposed about the reciprocating member 12 and attached at a radially outer surface of the elastomeric element 92 to a radially inner surface of the second cylindrical portion 91c of the load cap 91.

A radially inner surface of the elastomeric element is attached to a non-rotating first element 94 of a jaw tooth clutch which is disposed about and spaced from the reciprocating member 12 within the second cylindrical portion 91c of the load cap 91. The first element 94 of the jaw tooth clutch includes axially directed first clutch teeth 98 configured to engage a mating set of second clutch teeth 110 attached to the ballnut 20, as shown in FIG. 1a, when the reciprocating member 12 reaches the fully extended position. When the first and second sets of clutch teeth 98, 110 are engaged, rotational inertia of the ball nut 20 is transferred to the elastomeric element 92 by the first clutch element 94 wherein the rotational inertia is absorbed as torsional shear and dissipated through viscoelastic damping action within the elastomeric element, thereby quickly stopping rotation of the ballnut 20 and arresting the reciprocating movement of the reciprocating member 12 at an end of stroke position approximate the fully extended position without creating a mechanical shock.

In order to provide means for resetting the actuator from the extended to the retracted position, the shaft 46 of the driven member 36 of the brake 34 includes means for attaching external drive means in the form of an axially oriented square socket 116, best seen in FIG. 8, at an axial end of the shaft 46. The socket 116 is arranged to be accessible external to the actuator 10 for installation of a wrench or other drive means (not shown) for backdriving the gear train formed by the second and first gears 60, 58, thereby causing the ballnut 20 to rotate and driveably retract the reciprocating member 12 while simultaneously compressing the primary spring 26 and the boost spring 112. It will be noted, with reference to FIG. 1, that by judiciously utilizing a second gear 60 having a smaller diameter than the first gear 58, significant mechanical advantage is provided by the gear train to facilitate overcoming the combined force of the primary and boost springs 26, 112, during resetting operations.

Figures 3, 4, 5:
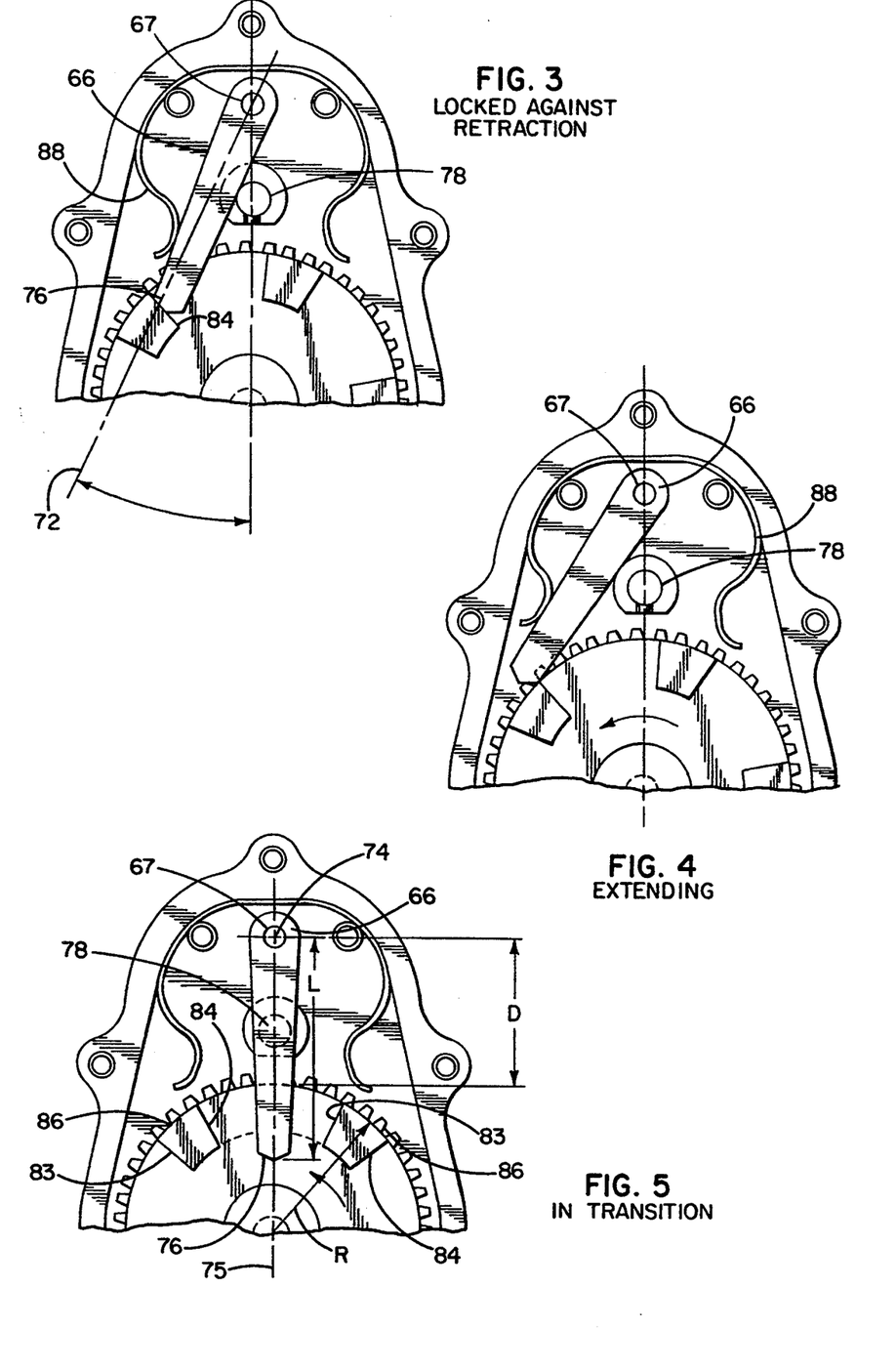
FIGS. 3–7 illustrate features and operation of a locking device of the actuator of FIG. 1.
Figure 6:
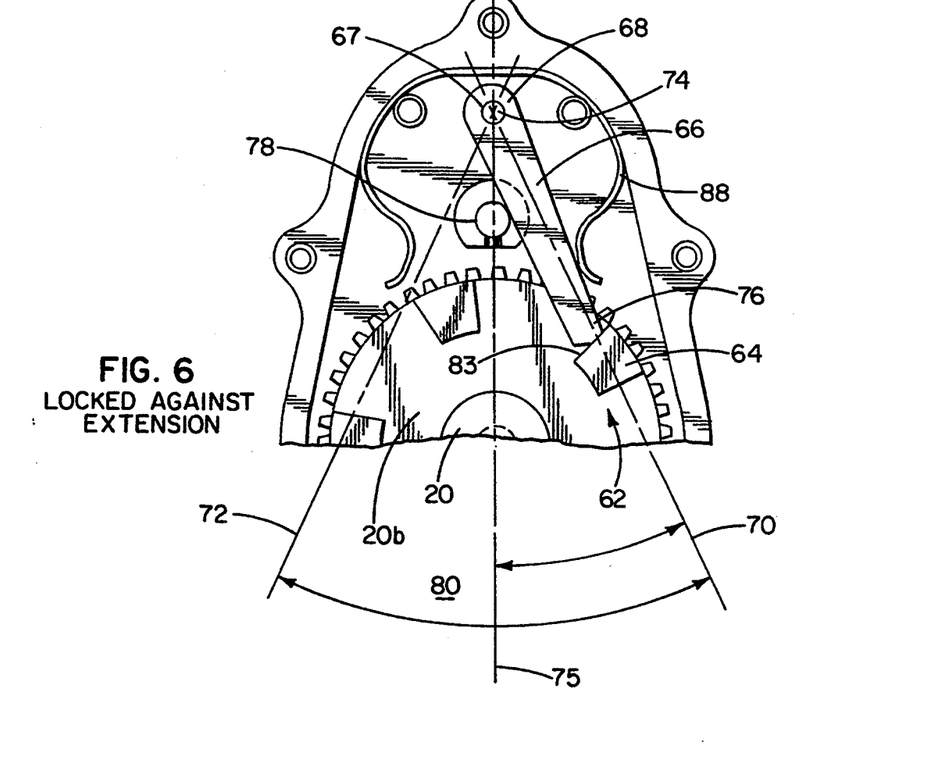

The actuator of the referenced embodiment further includes a locking device, generally designated 61, capable of preventing rotation of the ballnut 20, thereby allowing the reciprocating member 12 to be locked in either the extended or retracted positions. The locking device is of the ratchet and pawl type having a ratchet wheel, generally designated 62, formed by attaching axially extending, radially spaced ratchet teeth 64 to the left side, as illustrated in FIG. 1, of the annular flange 20b of ballnut 20 for rotation about the first axis 24 in a plane of rotation perpendicular to the first axis 24. A pawl 66 is pivotably attached by a pivot pin 67, as best seen in FIGS. 3–7, at a first end 68 for angular rotation between a first angular position 70, as shown in FIG. 6, and a second angular position 72, as shown in FIG. 3, about a pivot point 74 located radially outward of the ratchet wheel 62 along a line 75 extending radially from the first axis 24 in the plane of rotation of the ratchet wheel 62. A second end 76 of the pawl 66 is configured to engage the ratchet teeth 64 of the ratchet wheel 62 when the pawl 66 is disposed in either the first angular position 70, as shown in FIG. 6, or the second angular position 72, as shown in FIG. 3.

A retractable, axially directed locking pin 78 extending through the housing 22 is provided between the pivot point 74 and the ratchet wheel 62 along the radially extending line 75 between the first axis 24 and the pivot point 74. When the locking pin 78 is engaged in contact with the pawl 66, the pawl 66 is prevented from entering a circular sector, generally designated 80 in FIG. 6, of the plane of rotation of the ratchet wheel 62, the circular sector 80 being centered at the pivot point 74, bisected by line 75 and bounded by the first and second angular positions 70, 72 of the pawl 66.

Figure 7:
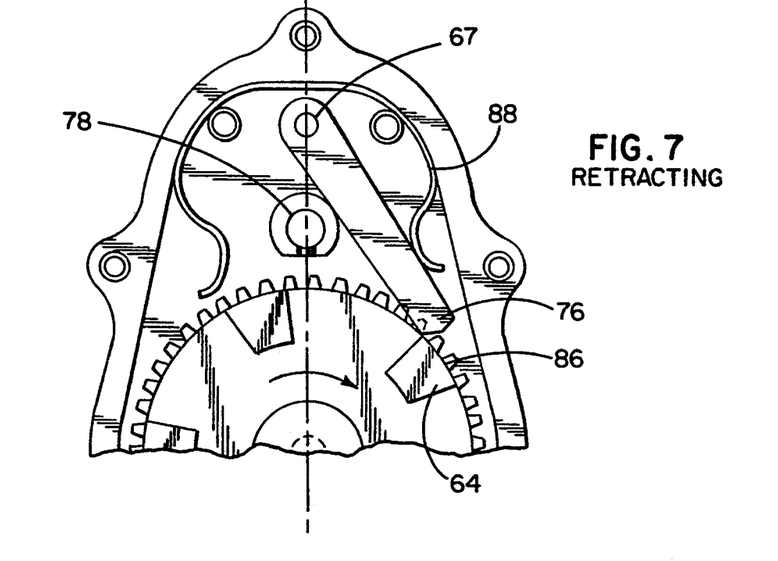

As seen in greater detail in FIG. 5, the ratchet wheel 62 of the preferred embodiment of the actuator 10 is formed by attaching to an axial face 81 of the radially extending annular flange 20b of the ballnut 20, a plurality of widely spaced ratchet teeth 64 having radially directed first and second sides 83, 84 and circular, arcuately shaped radially outer surfaces 86, with the surfaces 86 located at a radius "R" from the first axis 24. The pawl 66 has a length "L" from the pivot point 74 to the second end 76 greater than a radial distance "D" equal to the radial distance along line 75 between radius "R" and the pivot point 74 such that the pawl 66 may contact either the radially directed sides 83 or 84, as shown in FIGS. 3 and 6, or rest tangentially upon the radially outer surfaces 86, as shown in FIGS. 4 and 7, of the ratchet teeth 64. The pawl 66 further has a width configured to be significantly less than a minimum chordal distance between the ratchet teeth 64 such that the pawl 66 may reside between two adjacent ratchet teeth 64 without contacting the side of either tooth, as shown in FIG. 5.

As best seen in FIG. 6, the second end 76 of the pawl 66 is pointed in a manner such that, with the pawl 66 positioned in the first angular position 70, one facet of the second end of the pawl may bear squarely against the first side 83 of one of the ratchet teeth 64, and, as best seen in FIG. 3, with the pawl 66 positioned in the second angular position 72, the other facet of the second end of the pawl 66 may bear squarely against the second side 84 of one of the ratchet teeth 64.

Due to the various geometric relationships of the pawl 66 and the ratchet wheel 62, as described above, when the locking pin 78 is engaged, thereby preventing the pawl 66 from being rotated into the circular sector 80, the reciprocating member 12 of the actuator 10 will be locked against extension and free to move to a non-extended position as shown in FIGS. 6 and 7, respectively, when the pawl 66 is positioned in the first angular position 70, and conversely the reciprocating member 12 will be locked against retraction and free to extend, as shown in FIGS. 3 and 4, when the pawl 66 is in the second angular position 72.

A C-shaped leaf spring 88 is disposed in spatial relationship to the pawl 66 and configured such that alternate ends of the C-shaped spring 88 bear against the pawl 66 in a manner to urge the pawl 66 to move toward an angular position within the circular sector 80. When the locking pin 78 is retracted, the spring causes the pawl 66 to move in a direction toward reversing the locking/free running relationship of the locking device 61.

Operation of the instant invention will now be described with reference to FIG. 9 in which an actuator 10, constructed according to the referenced embodiment of the instant invention, is utilized as an ejection jack for a ram air turbine driven backup power source for an aircraft.

Figure 9:
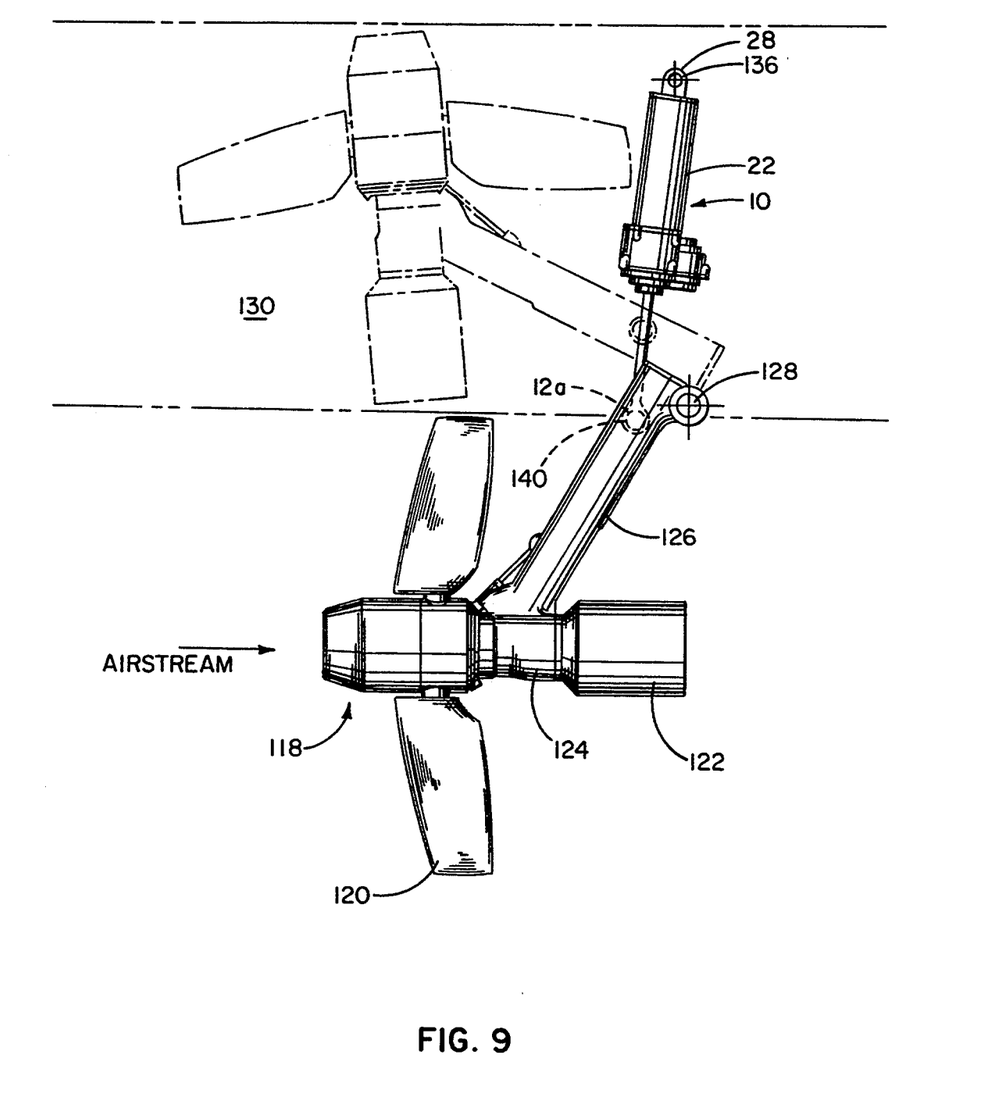
FIG. 9 is a partially schematic drawing showing an actuator according to the instant invention utilized as an ejection jack for a ram air turbine driven backup power source in an aircraft.

As shown in FIG. 9, a ram air turbine, generally designated 118, having blades 120 and a power source 122 are mounted on a distal end 124 of a strut 126 which is pivotably mounted at an upper end 128 to a support structure (not shown) within a storage bay 130 of the aircraft, indicated schematically by dashed lines, for rotation from a stowed position, as shown by dashed lines in FIG. 9, to a deployed position in the air stream, as shown by solid lines in FIG. 9, whereby the relative speed of the aircraft through the ambient air causes the ram air turbine 118 to rotate and drive the power source 122.

As seen with reference to FIG. 9, the actuator 10, alternatively referenced hereafter as the ejection jack 10, is pivotably attached by means of the apertured ear 28 of the housing 22 to support a structure (not shown) within the storage bay 130 for rotation about a first pivot point 136. The ejection jack 10 is pivotably attached by means of the apertured swivel end 12a of the reciprocating member 12 for rotation about a second pivot point 140 attached to the strut 126. As seen in FIG. 9, the spatial relationship of the first, second, and strut pivot points, as well as the configuration of the strut 126 and ejection jack 10 are judiciously selected such that, when the ram air turbine 118 is in a stowed position, as shown by dashed lines in FIG. 9, the ejection jack 10 will be in the fully retracted position as shown in FIG. 1, and conversely, when the ram air turbine 118 is in the deployed position, as shown by solid lines in FIG. 9, the ejection jack will be in the fully extended position as shown by FIG. 1a.

It will be appreciated that, when the ram air turbine 118 is in the stowed position, and the locking pin 78 is engaged, pawl 66 will be located in the first angular position 70, as shown in FIG. 6, thereby locking the ejection jack 10 against extension due to either the force applied to the lead screw by the fully compressed springs 26 and 112 or other inertial or gravitational forces which may be acting on the ram air turbine 118.

To deploy the ram air turbine 118, the locking pin 78 is retracted by mechanical means (not shown) such as a cable or a solenoid operatively attached to the locking pin 78, thereby releasing the locking device and allowing the ballnut 20 to rotate, which further allows energy stored in the compressed primary and boost springs 26 and 112 to be released to drive the reciprocating member 12 toward the fully extended position, which in turn causes the ram air turbine 118 to rotate toward the deployed position.

The boost spring 112 of the preferred embodiment aids the primary spring 26 during a short segment of the reciprocating movement approximate the stowed position in rotating the ram air turbine 118 out of the storage bay 130 to a rotational position whereat aerodynamic drag forces on the ram air turbine and strut begin to aid the ejection jack 10 in driving rotation of the ram air turbine 118 toward the deployed position.

As the reciprocating member 12 extends, the lead screw portion 12c causes rotation of the ballnut 20 which in turn causes the driven member 36 of the centrifugal brake 34 to rotate, thereby creating centrifugal forces in the brake shoes 52 which begin to compress the springs 56 and to move radially outward from their retracted position. The combined forces of the primary and boost springs 26, 112 of the ejection jack 10 and the aerodynamic drag on the ram air turbine 118 will cause the rotational speed of the driven member 36 to accelerate, eventually reaching a speed at which the first frictional surface 53 of the brake shoes 52 will be frictionally brought to bear against the second frictional surface 53 of the stationary brake member 42 of the housing 22, thereby limiting further increase in speed of rotation of the strut 126 during deployment.

It will be understood, with reference sequentially to FIGS. 6, 5, and 4 that, by virtue of rotation of the ballnut during extension of the ejection jack, the ratchet teeth 64 of the ratchet wheel 62 will move the pawl 66 from the first angular position, as shown in FIG. 6, to a ratcheting position, as shown in FIG. 4, adjacent the second angular position 72, whereat the pawl 66 will ride on the radially outer surface 86 of the ratchet teeth 64. It will be further understood that, after the pawl 66 has been so moved, the locking pin 78 may be reengaged, and the ejection jack 10 will continue to extend.

Just prior to the point at which the reciprocating member 12 reaches the fully extended position, the first and second sets of clutch teeth 98, 110 of the end of travel snubber mechanism 90 engage, and the ballnut 20 is quickly brought to a stop with the elastomeric element 92 absorbing the rotational inertia of the ballnut 20 in a manner to prevent the application of a mechanical shock to the aircraft support structure, the ram air turbine, or the ejection jack 10.

Following deployment of the ram air turbine 118, the locking pin 78 may be reengaged, if not engaged previously, to lock the pawl 66 in the second angular position 72, as shown in FIG. 3, and also thereby to lock the ram air turbine 118 in the deployed position.

Following the safe landing of the aircraft, the ram air turbine 118 may be restowed and the ejection jack 10 reset by attaching suitable drive means (not shown) to the square socket 116 of shaft 46, retracting the locking pin 78 to release the locking device 61 and backdriving the gear train formed by the second and first gears 60,58 to retract the reciprocating member 12 and cause the ram air turbine 118 to rotate back into the stowed position. It will be recognized that, after the backdriving process has commenced, the locking pin 78 may be reengaged as the locking device 61 will then be positioned, as shown in FIG. 7, to allow the reciprocating member 12 of the actuator 10 to be retracted freely and will prevent the reciprocating member 12 from extending by returning to the position shown in FIG. 6, should restowing operations be interrupted.

After the ram air turbine 118 has reached the stowed position, the locking pin 78 may be reengaged, if not reengaged previously during the resetting position, to lock the ram air turbine 118 in the stowed position and the drive means removed.

From the foregoing description, it will be appreciated that the actuator of the instant invention provides a number of significant improvements over the prior art.

The centrifugal brake and end of travel snubber mechanism of the instant invention provide effective control of the speed of the reciprocating motion of the reciprocating member 12 and end of travel energy absorption without the problems of leakage and unacceptably slow actuation at cold ambient temperatures experienced in prior art actuators utilizing hydraulic dashpots.

Utilization of springs 26, 112 to provide an internally contained source of motive force eliminates the need for costly external power sources required in prior art electromechanical actuators, thereby providing an actuator which is simple to build and virtually maintenance free, which results in increased reliability, cost effectiveness, and lighter weight.

The inclusion of the locking device 61 within the actuator of the instant invention eliminates the need for separate uplock and downlock devices which were required with prior art actuators, thereby providing additional cost and weight reductions while facilitating installation and operation.

It will be further appreciated that, in addition to providing significant improvements in construction and operational effectiveness, the actuator of the instant invention also provides an actuator which facilitates reset operations. Specifically, through utilization of a brake which by design is only active during extension, restowing speed is improved in comparison to hydraulically damped systems, particularly at cold ambient temperatures. Furthermore, the inclusion of features such as the square socket for attachment of a drive means, and the ability to utilize the mechanical advantage provided by the gear train of the actuator of the instant invention, provide a convenient method whereby an actuator having a large spring force may be easily reset by a flightline mechanic.

Although the instant invention has been illustrated and described in conjunction with particular embodiments thereof, it will be apparent to those skilled in the art that other combinations, modifications, and uses of the various features of the instant invention may be devised without departing from the spirit of the instant invention as set forth in the appended claims.

We claim:

1. An actuator comprising:
a recirculating ball screw device including a ballnut journaled for rotation about a first axis, and a lead screw drivingly connected to and carried by said ballnut;
a force transmitting reciprocating member attached to said lead screw and mounted for reciprocating movement along a path at least partially coincident with said first axis; and
a centrifugally actuated brake operatively connected to said reciprocating member in a manner to be driven by and to limit the speed of said reciprocating movement of said reciprocating member along said path;
said centrifugally actuated brake including a driven member mounted for rotation about a second axis;

said ballnut including gear teeth attached thereto to form a first gear rotatable about the first axis, and said driven member of the brake including gear teeth attached thereto to form a second gear rotatable about said second axis, said second gear being associated in gear mesh relation with said first gear, to thereby produce rotation of said driven member of the brake in response to rotation of the ballnut.

2. The actuator of claim 1 further including force producing means operatively connected to cause said reciprocating motion of said reciprocating member.

3. The actuator of claim 1 further including a disengagable locking device for preventing said reciprocating movement of said reciprocating member along said path.

4. The actuator of claim 1 further including an end of travel snubber operatively connected to said reciprocating member in a manner to absorb energy and lessen mechanical shock when said reciprocating member reaches an end of stroke position along said path.

5. The actuator of claim 1 further including reset means for positioning said reciprocating member along said path.

6. The actuator of claim 1 further including a disengageable locking device for preventing rotation of the ballnut.

7. The actuator of claim 6 wherein said locking device is capable of preventing rotation of the ballnut in either direction.

8. The actuator of claim 7 wherein said locking device is capable of allowing rotation of the ballnut in one direction while simultaneously preventing rotation of the ballnut in an opposite direction.

9. The actuator of claim 8 wherein said locking device includes in combination:

a ratchet wheel having radially spaced ratchet teeth attached to said ballnut for rotation about said first axis in a plane of rotation perpendicular to said first axis;

a pawl having a first end pivotably mounted for angular rotation between a first and a second angular position within said plane of rotation about a pivot point located radially outward of said ratchet wheel along a line extending radially from said first axis in the plane of rotation, said pawl having a second end configured to engage said ratchet teeth of said ratchet wheel when said pawl is disposed in either said first or second angular positions; and a locking pin engageable to prevent said pawl from rotating angularly in the plane of rotation within a circular sector centered at the pivot point and angularly bounded by the first and second angular positions;

said ratchet teeth, pawl, and locking pin being configured and operatively interconnected such that when said locking pin is engaged with said pawl in said first angular position, said pawl engages said ratchet teeth in a manner which allows said ballnut to rotate freely in one direction of rotation and prevents said ballnut from rotating in an opposite direction of rotation;

said ratchet teeth, pawl and locking pin also being configured and operatively interconnected such that when said locking pin is engaged with said pawl in said second angular position, said pawl engages said ratchet teeth in a manner which allows said ballnut to rotate freely in said opposite direction of rotation and prevents said ballnut from rotating in said one direction of rotation;

said ratchet teeth, pawl, and locking pin also further configured and operatively interconnected such that when said locking pin is disengaged, said pawl may be angularly rotated by said ratchet teeth from one of said first or second angular positions to the other of said first or second angular positions.

10. The actuator of claim 9 wherein said locking device further includes a spring means operatively connected to urge said pawl to move toward an angular position within said circular sector.

11. The actuator of claim 1 wherein said driven member of said brake includes means for attaching external drive means.

12. The actuator of claim 11 wherein said second gear has fewer gear teeth than said first gear.

13. The actuator of claim 1 wherein:

said driven member of said brake includes a radially extendible first frictional surface configured to move radially outward from an initial retracted position incident with a non-rotating condition of the driven member to a maximum extended position in response to centrifugal forces generated as a result of rotation of the driven member, and said brake further includes a stationary member having disposed upon a cylindrical radially inner surface thereof a second frictional surface, said second frictional surface being spaced radially outward from said first frictional surface at a distance less than said maximum extended position of the first frictional surface whereat the first frictional surface will be caused to frictionally contact the second frictional surface in response to rotation of said driven member.

14. The actuator of claim 13 wherein said driven member includes:

a shaft rotatable about said second axis and having a radially directed hole passing perpendicularly through said shaft;

a guide pin extending through said hole and from alternate sides of said shaft;

a pair of circular arch-shaped brake shoes slideably mounted on said guide pin on alternate sides of said shaft, said first frictional surface being provided by a radially outer surface of said brake shoes;

a retainer attached at each end of said guide pin for retaining said brake shoes thereupon; and a spring disposed between said retainer and said brake shoe at each end of said guide pin for urging said brake shoes toward said retracted position.

15. An actuator comprising:

a recirculating ball screw device including a ballnut journaled for rotation about a first axis, and a lead screw drivingly connected to and carried by said ballnut;

a force transmitting reciprocating member attached to said lead screw and mounted for reciprocating movement along a path at least partially coincident with said first axis; and a centrifugally actuated brake operatively connected to said reciprocating member in a manner to be driven by and to limit the speed of said reciprocating movement of said reciprocating member along said path;

said centrifugally actuated brake including in combination, a radially inner driven member mounted for rotation about a second axis and including a radially extendible first frictional surface configured to move radially outward from an initial retracted position incident with a non-rotating condition of the driven member to a maximum extended position in response to centrifugal forces generated as a result of rotation of the driven member, and a stationary radially outer member having disposed upon a cylindrical radially inner surface thereof a second frictional surface, said second frictional surface being spaced radially outward from said first frictional surface at a distance less than said maximum extended position of the first frictional surface whereat the first frictional surface will be caused to frictionally contact the second frictional surface in response to rotation of said driven member;

said driven member of said brake including;
   a shaft rotatable about said second axis and having a radially directed hole passing perpendicularly through said shaft;
   a guide pin extending through said hole and from alternate sides of said shaft;
   a pair of circular arch-shaped brake shoes slideably mounted on said guide pin on alternate sides of said shaft, said first frictional surface being provided by a radially outer surface of said brake shoes;
   a retainer attached at each end of said guide pin for retaining said brake shoes thereupon; and
   a spring disposed between said retainer and said brake shoe at each end of said guide pin for urging said brake shoes toward said retracted position.

16. An actuator comprising:
a force transmitting reciprocating member including a lead screw of a recirculating ball screw device;
said reciprocating member being mounted for reciprocating movement between a first position and a second position along a path;
said lead screw of said reciprocating member being drivingly connected to and carried by a ballnut journaled for rotation about a first axis at least partially coincident with said path;
self contained force producing means operatively connected to said reciprocating member for storing energy when said reciprocating member is disposed between said first and second positions along said path and applying force for urging said reciprocating member toward said second position along said path; and
reset means operably connected to said reciprocating member for returning said reciprocating member to said first position along said path, and for simultaneously resetting the force producing means.

17. The actuator of claim 16 further including a locking device for preventing said reciprocating movement of said reciprocating member along said path.

18. The actuator of claim 16 further including an end of travel snubber operatively connected to said reciprocating member in a manner to absorb energy and lessen mechanical shock when said reciprocating member reaches said second position.

19. The actuator of claim 16 further including a centrifugally actuated brake operatively connected to said reciprocating member in a manner to be driven by and to limit the speed of said reciprocating movement of said reciprocating member along said path.

20. The actuator of claim 19 wherein said centrifugally actuated brake includes,
a driven member mounted for rotation about a second axis.

21. The actuator of claim 20 wherein said ballnut is operatively connected to produce rotation of said driven member of the brake in response to rotation of the ballnut.

22. The actuator of claim 21 wherein said ballnut includes gear teeth attached thereto to form a first gear rotatable about the first axis, and
said driven member of the brake includes gear teeth attached thereto to form a second gear rotatable about said second axis,
said second gear being associated in gear mesh relation with said first gear.

23. The actuator of claim 20 wherein said driven member of said brake includes:
   a shaft rotatable about said second axis and having a radially directed hole passing perpendicularly through said shaft;
   a guide pin extending through said hole and from alternate sides of said shaft;
   a pair of circular arch-shaped brake shoes slideably mounted on said guide pin on alternate sides of said shaft, said first frictional surface being provided by a radially outer surface of said brake shoes;
   a retainer attached at each end of said guide pin for retaining said brake shoes thereupon; and
   a spring disposed between said retainer and said brake shoe at each end of said guide pin for urging said brake shoes toward said retracted position.

24. The actuator of claim 16 further including a disengageable locking device for preventing rotation of the ballnut.

25. The actuator of claim 24 wherein said locking device is capable of preventing rotation of the ballnut in either direction.

26. The actuator of claim 25 wherein said locking device is capable of allowing rotation of the ballnut in one direction while simultaneously preventing rotation of the ballnut in an opposite direction.

27. An actuator comprising:
a recirculating ball screw device including a ballnut journaled for rotation about a first axis, and a lead screw drivingly connected to and carried by said ballnut;
a force transmitting reciprocating member attached to said lead screw and mounted for reciprocating movement along a path at least partially coincident with said first axis; and
a disengageable locking device for preventing rotation of the ballnut;
said locking device being capable of selectively preventing rotation of the, ballnut in either direction;
said locking device further being capable of allowing rotation of the ballnut in one direction while simultaneously preventing rotation of the ballnut in an opposite direction;
said locking device including in combination:
   a ratchet wheel having radially spaced ratchet teeth attached to said ballnut for rotation about said first axis in a plane of rotation perpendicular to said first axis;
   a pawl having a first end pivotably mounted for angular rotation between a first and a second angular position within said plane of rotation about a pivot point located radially outward of said ratchet wheel along a line extending radially from said first axis in the plane of rotation, said pawl having a second end configured to engage said ratchet teeth of said ratchet wheel when said pawl is disposed in either said first or second angular positions; and a locking pin engageable to prevent said pawl from rotating angularly in the plane of rotation within a circular sector centered at the pivot point and angularly bounded by the first and second angular positions;

said ratchet teeth, pawl, and locking pin being configured and operatively interconnected such that when said locking pin is engaged with said pawl in said first angular position, said pawl engages said ratchet teeth in a manner which allows said ballnut to rotate freely in one direction of rotation and prevents said ballnut from rotating in an opposite direction of rotation;

said ratchet teeth, pawl, and locking pin also being configured and operatively interconnected such that when said locking pin is engaged with said pawl in said second angular position, said pawl engages said ratchet teeth in a manner which allows said ballnut to rotate freely in said opposite direction of rotation and prevents said ballnut from rotating in said one direction of rotation;

said ratchet teeth, pawl, and locking pin also further configured and operatively interconnected such that when said locking pin is disengaged, said pawl may be angularly rotated by said ratchet teeth from one of said first or second angular positions to the other of said first or second angular positions.

28. The actuator of claim 27 wherein said locking device further includes a spring means operatively connected to urge said pawl to move toward an angular position within said circular sector.

29. In an aircraft having a deployable ram air turbine attached thereto in a manner allowing the ram air turbine to move between a stowed position and a deployed position whereat the ram air turbine extends into the surrounding airstream, an ejection jack attached between said aircraft and ram air turbine for moving the ram air turbine between the stowed and deployed positions, the ejection jack including a recirculating ball screw device having a ballnut journaled for rotation about a first axis, and a lead screw drivingly connected to and carried by said ballnut;

said lead screw being free to move axially along said first axis, and including a force transmitting reciprocating member attached to said lead screw with said force transmitting reciprocating member being mounted for reciprocating movement along a path at least partially coincident with said first axis;

said ballnut being free to rotate about the axis in response to axial movement of the lead screw incident with reciprocating movement of the force transmitting reciprocating member along the path;

with said reciprocating movement of said reciprocating force transmitting member of said ejection jack causing movement of the ram air turbine between the stowed and deployed positions.

30. The aircraft of claim 29 wherein said lead screw is restrained against rotation, and said ballnut is restrained from moving axially.

31. The aircraft of claim 29 further including a centrifugally actuated brake operatively connected to said ballnut of said ejection jack in a manner to be driven by said ballnut in response to and limit the speed of said reciprocating movement of said reciprocating member along said path.

32. The aircraft of claim 31 wherein said centrifugally actuated brake includes a driven member mounted for rotation about a second axis;

said ballnut includes gear teeth attached thereto to form a first gear rotatable about the first axis; and said driven member of the brake includes gear teeth attached thereto to form a second gear rotatable about said second axis;

said second gear being associated in gear mesh relation with said first gear, to thereby produce rotation of said driven member of the brake in response to rotation of the ballnut.

33. The aircraft of claim 32 wherein:

said driven member of said brake includes a radially extendible first frictional surface configured to move radially outward from an initial retracted position incident with a non-rotating condition of the driven member to a maximum extended position in response to centrifugal forces generated as a result of rotation of the driven member; and said brake further includes a stationary member having disposed upon a cylindrical radially inner surface thereof a second frictional surface, with said second frictional surface being spaced radially outward from said first frictional surface at a distance less than said maximum extended position of the first frictional surface whereat the first frictional surface will be caused to frictionally contact the second frictional surface in response to rotation of said driven member.

34. The aircraft of claim 33 wherein said driven member of said brake includes:

a shaft rotatable about said second axis and having a radially directed hole passing perpendicularly through said shaft;

a guide pin extending through said hole and from alternate sides of said shaft;

a pair of circular arch-shaped brake shoes Slideably mounted on said guide pin on alternate sides of said shaft, said first frictional surface being provided by a radially outer surface of said brake shoes;

a retainer attached at each end of said guide pin for retaining said brake shoes thereupon; and a spring disposed between said retainer and said brake shoe at each end of said guide pin for urging said brake shoes toward said retracted position.

35. The aircraft of claim 29 wherein the ejection jack further includes stored energy force producing means operatively connected to cause said reciprocating motion of said reciprocating member.

36. The aircraft of claim 29 wherein the ejection jack further includes a disengagable locking device for preventing said reciprocating movement of said reciprocating member along said path.

37. The aircraft of claim 29 wherein the ejection jack further includes an end of travel snubber operatively connected to said reciprocating member in a manner to absorb energy and lessen mechanical shock when said reciprocating member reaches an end of stroke position along said path.

38. The aircraft of claim 29 wherein the ejection jack further includes reset means for positioning said reciprocating member along said path.

39. The aircraft of claim 38 wherein the reset means include means for rotating said ballnut about said first axis to thereby move said reciprocating force transmitting member along said path.

40. The aircraft of claim 32 wherein said driven member of said brake includes means for attaching external drive means, thereby allowing said external drive means to rotate said ballnut of said ejection jack to move said reciprocating force transmitting member along said path, and thus to move said ram air turbine between the stowed and deployed positions.

41. The aircraft of claim 40 wherein said second gear has fewer gear teeth than said first gear.

42. The aircraft of claim 29 further including a disengageable locking device for preventing rotation of the ballnut.

43. The aircraft of claim 42 wherein said locking device is capable of preventing rotation of the ballnut in either direction.

44. The aircraft of claim 43 wherein said locking device is capable of allowing rotation of the ballnut in one direction while simultaneously preventing rotation of the ballnut in an opposite direction.

45. The aircraft of claim 44 wherein said locking device includes in combination:
   a ratchet wheel having radially spaced ratchet teeth attached to said ballnut for rotation about said first axis in a plane of rotation perpendicular to said first axis;
   a pawl having a first end pivotably mounted for angular rotation between a first and a second angular position within said plane of rotation about a pivot point located radially outward of said ratchet wheel along a line extending radially from said first axis in the plane of rotation,
   said pawl having a second end configured to engage said ratchet teeth of said ratchet wheel when said pawl is disposed in either said first or second angular positions; and
   a locking pin engageable to prevent said pawl from rotating angularly in the plane of rotation within a circular sector centered at the pivot point and angularly bounded by the first and second angular positions;
   said ratchet teeth, pawl, and locking pin being configured and operatively interconnected such that when said locking pin is engaged with said pawl in said first angular position, said pawl engages said ratchet teeth in a manner which allows said ballnut to rotate freely in one direction of rotation and prevents said ballnut from rotating in an opposite direction of rotation;
   said ratchet teeth, pawl and locking pin also being configured and operatively interconnected such that when said locking pin is engaged with said pawl in said second angular position, said pawl engages said ratchet teeth in a manner which allows said ballnut to rotate freely in said opposite direction of rotation and prevents said ballnut from rotating in said one direction of rotation;
   said ratchet teeth, pawl, and locking pin also further configured and operatively interconnected such that when said locking pin is disengaged, said pawl may be angularly rotated by said ratchet teeth from one of said first or second angular positions to the other of said first or second angular positions.

46. The aircraft of claim 45 wherein said locking device further includes a spring means operatively connected to urge said pawl to move toward an angular position within said circular sector.

47. In an aircraft having a deployable ram air turbine attached thereto in a manner allowing the ram air turbine to move between a stowed position and a deployed position whereat the ram air turbine extends into the surrounding airstream,
   an ejection jack attached between said aircraft and said ram air turbine for moving the ram air turbine between the stowed and deployed positions, said ejection jack including:
   integral drive means including a recirculating ballscrew device having a force transmitting reciprocating member for moving the ram air turbine from the stowed position to the deployed position; and
   internally contained, resettable, stored energy force producing means operatively connected to said force transmitting reciprocating member to provide motive force thereto;
   said integral drive means including reset means for returning said ram air turbine to said stowed position and for simultaneously resetting said force producing means.

48. The aircraft of claim 47 wherein said reset means include means for attaching external drive means.

49. The aircraft of claim 47 wherein the ejection jack further includes deployment rate regulating means operatively coupled to said integral drive means, whereby the rate at which the force producing means may move the ram air turbine between the stowed and deployed positions may be controlled.

50. The aircraft of claim 49 wherein said deployment rate regulating means includes centrifugal brake means.

51. In an aircraft having a deployable ram air turbine attached thereto in a manner allowing the ram air turbine to move between a stowed position and a deployed position whereat the ram air turbine extends into the surrounding airstream,
   an ejection jack attached between said aircraft and said ram air turbine for moving the ram air turbine between the stowed and deployed positions, said ejection jack including:
   integral drive means including a recirculating ballscrew device having a force transmitting reciprocating member for moving the ram air turbine from the stowed position to the deployed position; and
   disengagable locking means for restraining the ram air turbine at a point along a path extending between and including the stowed and deployed positions.

52. The aircraft of claim 51 wherein said locking means are capable of allowing movement of the ram air turbine in one direction along said path while simultaneously preventing movement of the ram air turbine along the path in an opposite direction.

* * * * *